United States Patent
Fukushima et al.

[11] Patent Number: 5,903,303
[45] Date of Patent: May 11, 1999

[54] MULTI-EYE IMAGE PICKUP APPARATUS

[75] Inventors: Nobuo Fukushima, Yokohama; Shigeki Okauchi, Kodaira; Masayoshi Sekine; Tatsushi Katayama, both of Tokyo, all of Japan

[73] Assignee: Canon Kabushiki Kaisha, Tokyo, Japan

[21] Appl. No.: 08/820,412

[22] Filed: Mar. 12, 1997

Related U.S. Application Data

[63] Continuation of application No. 08/320,179, Oct. 7, 1994, abandoned.

[30] Foreign Application Priority Data

Oct. 13, 1993 [JP] Japan .................................. 5-255533

[51] Int. Cl.⁶ .......................... H04N 13/02; H04N 07/18
[52] U.S. Cl. .............................. 348/47; 348/42; 348/36; 348/46; 348/334; 348/207
[58] Field of Search .................................. 348/42, 43, 47, 348/207, 221, 364, 49, 48, 334, 36, 46

[56] References Cited

U.S. PATENT DOCUMENTS

| | | | |
|---|---|---|---|
| 4,601,053 | 7/1986 | Grumet | 348/49 |
| 4,725,863 | 2/1988 | Dumbreck | 354/112 |
| 4,879,596 | 11/1989 | Miura et al. | 348/49 |
| 4,881,122 | 11/1989 | Murakami | 348/49 |
| 5,003,385 | 3/1991 | Sudo | 348/49 |
| 5,063,441 | 11/1991 | Lipton et al. | 348/47 |
| 5,065,236 | 11/1991 | Diner | 348/42 |
| 5,184,172 | 2/1993 | Miyazaki | 348/221 |
| 5,220,441 | 6/1993 | Gerstenberger | 348/42 |
| 5,341,190 | 8/1994 | Ogawa | 348/49 |
| 5,488,414 | 1/1996 | Hirasawa et al. | 348/207 |
| 5,699,108 | 12/1997 | Katayama et al. | 348/47 |

*Primary Examiner*—Tommy P. Chin
*Assistant Examiner*—Anand S. Rao
*Attorney, Agent, or Firm*—Morgan & Finnegan LLP

[57] ABSTRACT

To realize a multi-eye image pickup apparatus which can perform proper exposure for each of a plurality of image pickup devices, the multi-eye image pickup apparatus having a plurality of image pickup devices is arranged to have an exposure amount controlling device provided for each of the image pickup devices, for controlling an exposure amount, and a control unit for determining an exposure amount of each exposure amount controlling device, based on photometric values of pickup images obtained by the plurality of image pickup devices or based on photometric values of split images obtained by splitting each of the pickup images into a plurality of zones.

8 Claims, 6 Drawing Sheets

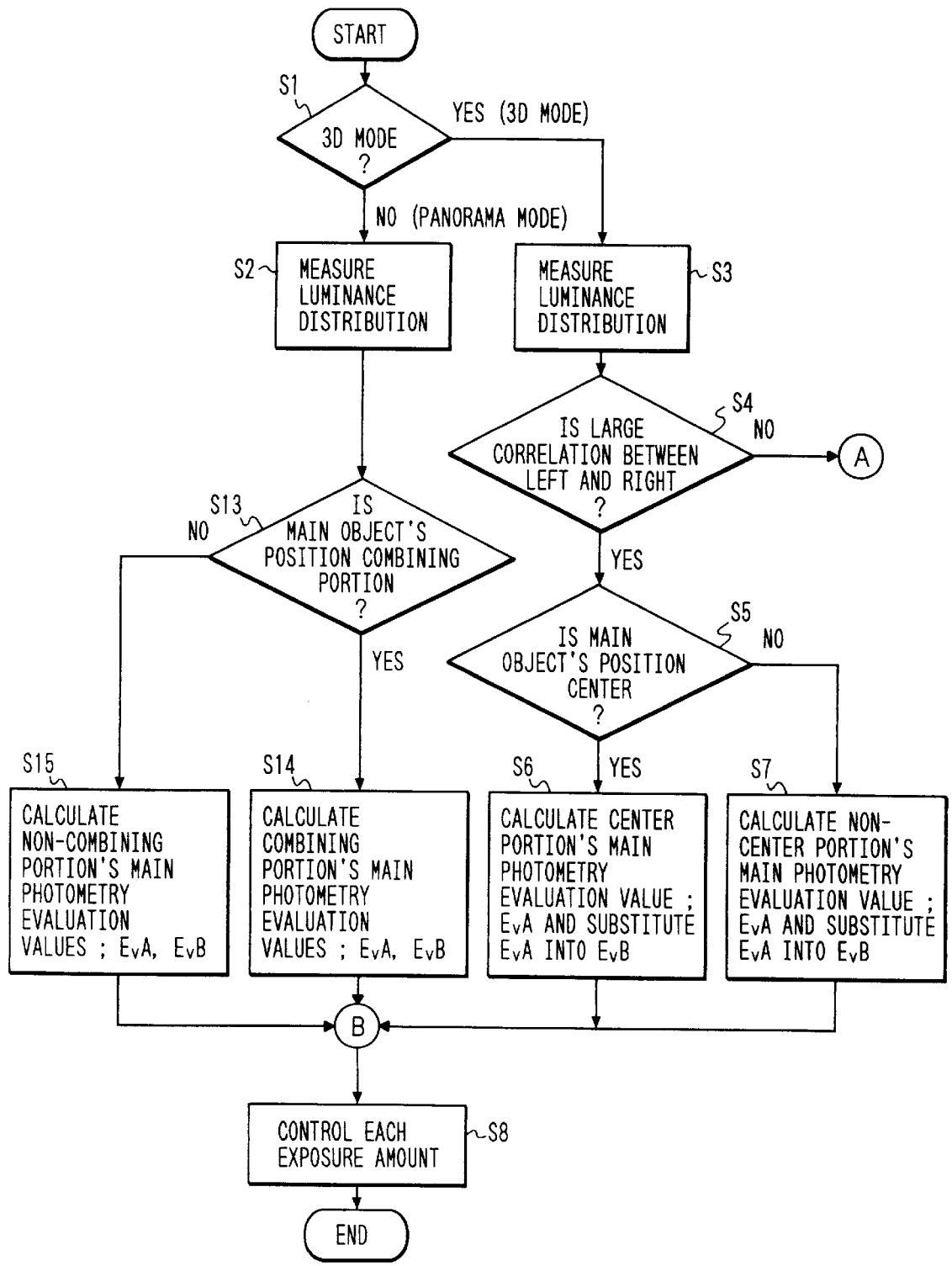

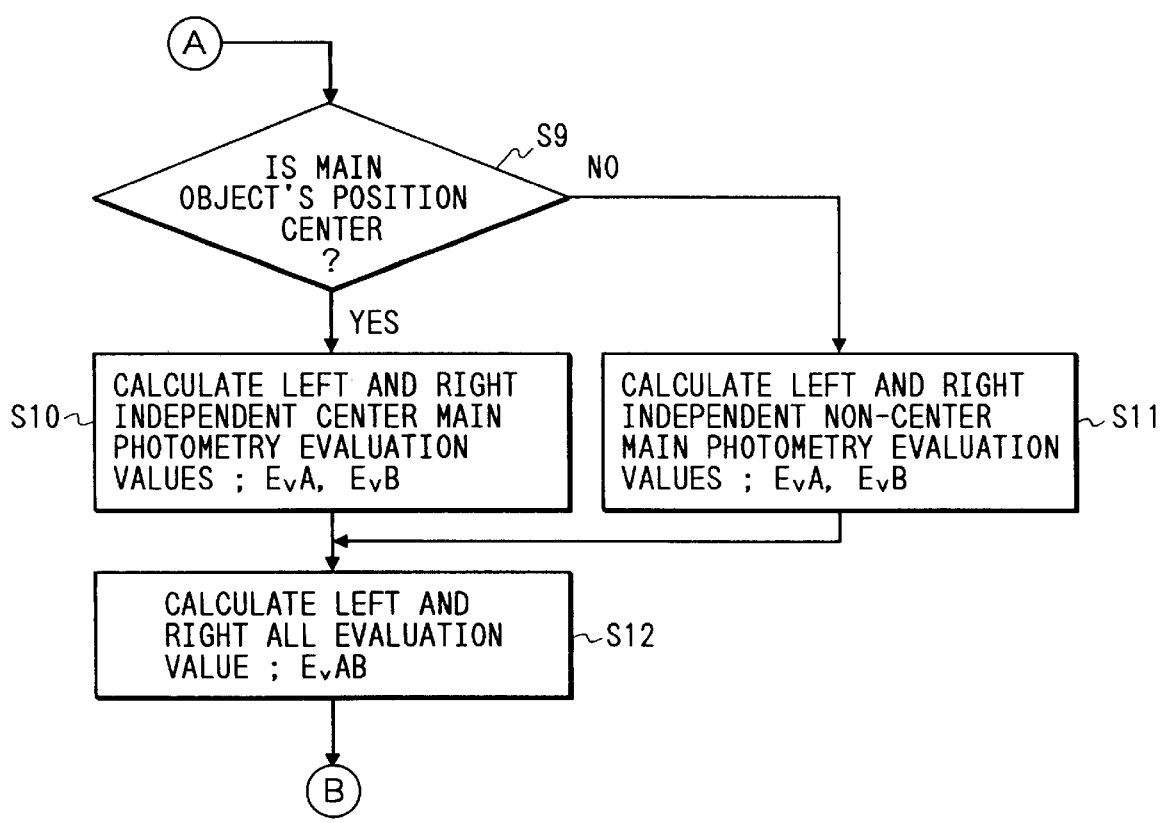

MULTI-EYE IMAGE PICKUP APPARATUS

This is a continuation of application Ser. No. 0/320,179, filed on Oct. 7, 1994, now abandoned.

BACKGROUND OF THE INVENTION

1. Field of the Invention

The present invention relates to a multi-eye image pickup apparatus having two or more image pickup devices, and more particularly to a photometric system in a camera for picking up image data for stereoscopic vision with binocular parallax between the left and right eyes or in a camera apparatus for picking up image data, which is for combining images obtained by a plurality of respective pickup portions with each other, changing a width-to-length ratio of image plane (or changing the aspect ratio), and displaying a reconstructed image.

2. Related Background Art

FIG. 7 is a block diagram to show structure of a conventional multi-eye image pickup apparatus of this type.

In FIG. 7, reference numeral 71 designates a control unit for controlling the overall operation, 72 a switch for changeover between a photography mode and an adjustment mode, 73 a switch for giving an instruction of either photography start or photography stop, and 77R, 77L right and left pickup portions, respectively. Although not shown, there are a pickup lens, an aperture stop, a shutter, and an image sensor included in each pickup portion, which is thus equivalent to those for movie cameras or for still cameras.

Further, each block 78R, 78L denotes a signal processing unit for performing color processing for signals obtained by the associated image pickup portion 77R, 77L, and 79 further denotes a recording portion for storing the signals obtained by the image pickup portions 77R, 77L in a magnetic tape or in a magnetic disk.

Supposing the above arrangement is used to take images of point P, the images obtained by the left and right image pickup portions have a binocular parallax of angle θ. When reconstructed images are observed through the left and right corresponding eyes, a stereoscopic image can be attained.

Incidentally, the angle θ is called as a convergence angle and a distance L between the two image pickup portions as a base length.

There is also proposed a system for obtaining a panorama image by controlling the convergence angle, the zoom ratio, etc. of such a multi-eye camera and combining the images obtained by the two image pickup portions.

In the conventional cameras, a control of exposure amount for the image pickup system having two image pickup portions as described is performed in such a manner that photometry is first carried out with one image pickup portion (say R), similarly as with an ordinary single-eye video camera, and that an exposure amount of the other image pickup portion (say L) is controlled so as to become equal to that of R.

SUMMARY OF THE INVENTION

However, the conventional multi-eye image pickup apparatus as described above had the following problems.

For example, let us consider cases to obtain panorama images. In detail, where images obtained from a plurality of respective image pickup portions are combined with each other to indicate a reconstructed image with a different aspect ratio of image plane (after aspect conversion), the two image pickup portions are directed to mutually different scenes (objects).

Thus, there could be some cases where exposure is appropriate for one image pickup portion but is not necessarily appropriate for the other.

In the other image pickup portion with inappropriate exposure, as described, an image would whiten due to over-exposure or inversely blacken due to under-exposure, raising a problem that a preferable image would not be attained upon combining the two images.

The present invention has been accomplished in view of the above problems in the conventional technology, and an object of the invention is to provide a multi-eye image pickup apparatus which can perform suitable exposure for each of a plurality of image pickup devices.

A multi-eye image pickup apparatus of the present invention comprises a plurality of image pickup means, exposure amount controlling means provided for each of said image pickup means, for controlling an exposure amount, and a control unit for determining an exposure amount of each exposure amount controlling means, based on photometric values of a plurality of pickup images obtained by said plurality of image pickup means or based on photometric values of respective split images obtained by splitting each of the pickup images into a plurality of zones.

In this case, the apparatus may be arranged to have pickup mode changing means for changing a convergence angle of the image pickup means to pick up images either in a panorama mode or in a 3D mode, and the control unit may be arranged to determine an exposure amount depending upon a current pickup mode.

Further, the control unit may be so arranged that in the panorama mode it performs weighted photometry on a combining portion between a plurality of pickup images and determines the exposure amounts, based on values in the photometry.

In the present invention, an exposure amount of each image pickup means is determined based on a plurality of images obtained by the plurality of image pickup means or based on images obtained by splitting the plurality of images. In this determination of exposure amount, each exposure amount can be determined with the images in connection with each other, whereby an exposure amount can be determined so as to be suitable for each of the image pickup means.

Since there is a difference of whether or not the two pickup means are taking a same object in the case of the multi-eye image pickup apparatus having the panorama mode and the 3D mode, optimization of exposure amount can be realized by determining the exposure amount, taking the pickup mode into consideration.

BRIEF DESCRIPTION OF THE DRAWINGS

FIG. 6 is comprised of FIGS. 6A and 6B showing flowcharts of photometry and exposure control in the present invention.

DETAILED DESCRIPTION OF THE PREFERRED EMBODIMENTS

Figure 1:
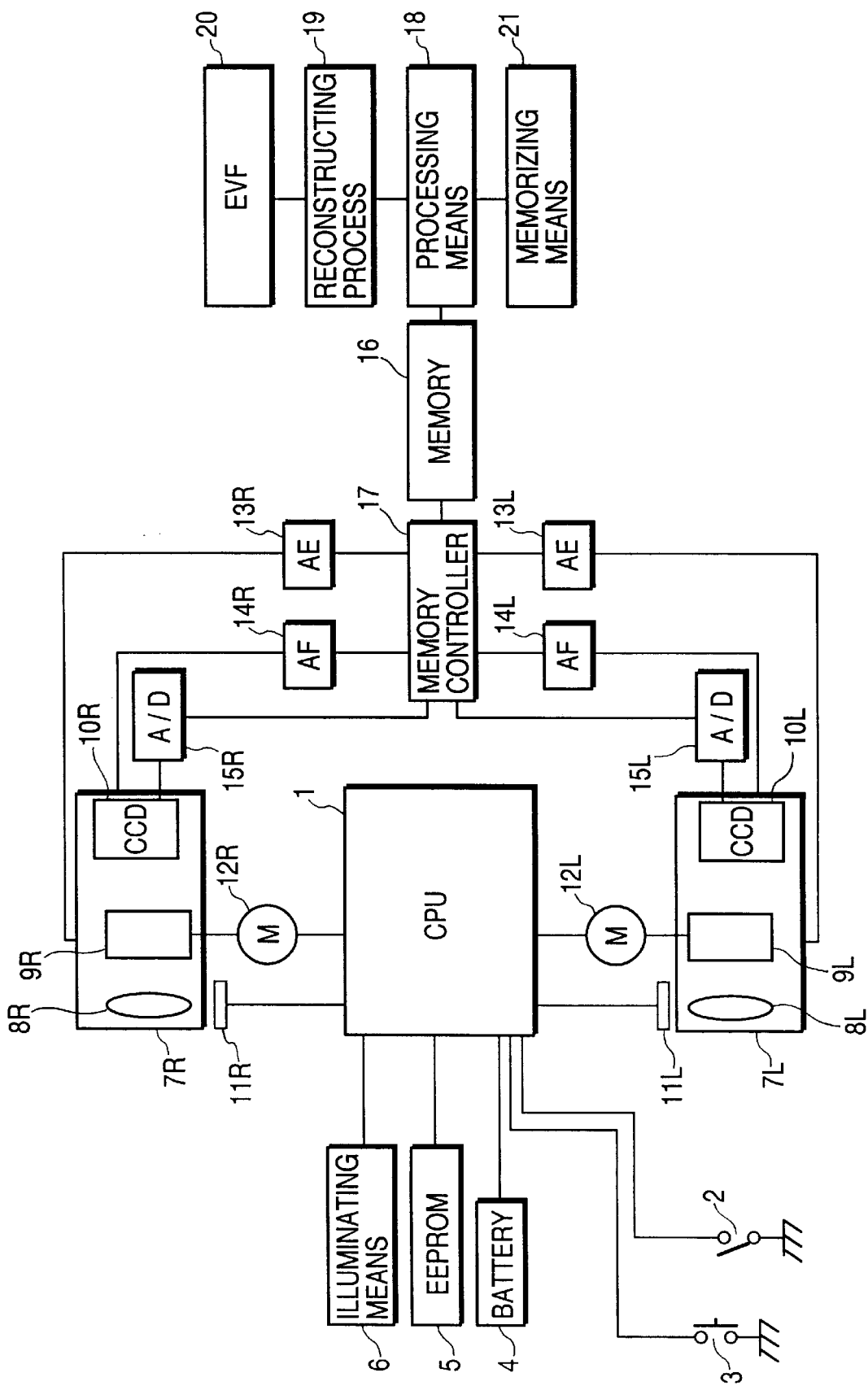
FIG. 1 is a block diagram of a multi-eye image pickup camera.

FIG. 1 is a drawing to show the structure of an embodiment of the present invention.

In FIG. 1, reference numeral 1 designates a CPU (control unit) for controlling the overall operation of apparatus, 2 a switch for changeover between a panorama photography mode (P mode) and a stereoscopic photography mode (hereinafter referred to as a 3D mode), 3 a switch for giving an instruction of either photography start or photography stop, 4 a battery for supplying power to a camera, 5 an EEPROM which is a non-volatile memory for storing various parameters of a camera, 6 an illumination device for illuminating an object, and 7R, 7L right and left image pickup portions, respectively.

The each image pickup portion 7R, 7L consists of a pickup lens group 8R, 8L, an exposure control member 9R, 9L including an aperture stop, a shutter, etc., and an image sensor 10R, 10L such as a CCD.

Further, 11R, 11L denote lens drive portions for performing zoom drive and focus drive; 12R, 12L drive motors as pickup mode changing means for changing the convergence angle between a pair of image pickup portions 7R, 7L; 13R, 13L drive portions for driving the respective exposure control members in the right and left image pickup portions; 14R, 14L autofocus control portions for controlling the right and left image pickup portions for controlling focusing; 15R, 15L A/D converters for converting outputs from the image sensors in the right and left image pickup portions into digital signals; 16 a memory for temporarily storing the digital data; 17 a memory controller for controlling read and write of data while assigning addresses of memory 16; 18 an image signal processing unit for combining output signals from the right and left image pickup portions and for performing filtering such as the color processing; 19 a reconstruction signal processing unit for supplying the images from the image pickup portions to an electric viewfinder (EVF); 20 a display unit such as EVF for checking the images obtained by the image pickup portions or for indicating reconstructed images; and 21 a recording portion for storing the signals obtained by the respective image pickup portions in a magnetic tape or in a magnetic disk.

Next described is the way of split of image plane for photometry in the present invention.

Figure 2:
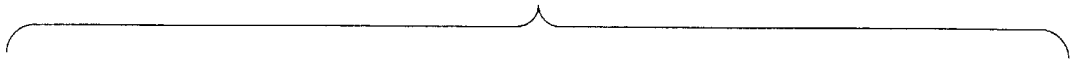
FIG. 2 is a drawing to illustrate division of left and right image planes.

FIG. 2 is a drawing to show an example of split in the present embodiment.

Here, L represents an image plane of the left image pickup system while R an image plane of the right image pickup system. The both images are data taken by the memory controller 17 from the A/D converters 15R, 15L into the memory 16.

In the present embodiment the CPU splits each of the left and right images into twenty five logical blocks in an array of 5×5. Numerals of from 1 to 25 are given for the blocks to discriminate from each other for convenience sake.

Each of the left and right image planes is split as described above, brightness per unit area is obtained for each block, each brightness value is multiplied by an individual weighting factor for each block, and an overall exposure level is then determined.

For example, next described is a method of photometry in the 3D mode.

Figure 3A:
FIGS. 3A and 3B are drawings to illustrate an example of photometry data in the 3D mode and weighting coefficients.

Suppose luminance data as shown in FIG. 3A was obtained as photographic data. In the drawing boldface numbers represent average luminance levels of the respective blocks. The larger the number, the brighter the block. Although gradations of luminance are expressed by 8 bits or so in actual applications, they are expressed by 0 to 15 (4 bits) herein for simplifying the description. Further, a distribution of luminances is also simplified for the purpose of description.

Under the above preconditions, a correlation is taken between luminance distribution data of the left and right image planes, and it is then found that the two images have respective luminance distributions nearly equal to each other. (A low correlation case will be described later.)

To determine where a main object is located in the image plane, the photometry and evaluation system used in ordinary silver-salt cameras can be employed.

For example, in the example shown in FIG. 3A, luminances in the central portion of image plane are smaller than those in the peripheral portion, from which it can be determined that a main object is located nearly at the center of image plane.

Thus, photometry with weighting in the central portion of the image plane is employed (which is the so-called average center-weighted metering).

Figure 3B:

For example, weighting factors are set as shown in FIG. 3B. As shown, Cmax=3, where Cmax is a maximum weighting factor, is set for the average luminance of block 13 of the left pickup system, and a factor Cl=1 is set for each block 7, 8, 9, 12, 14, 17, 18, 19 around the block 13. Further, Cmin=0 is set for all other blocks.

Calculating with such factors, a photometric evaluation value becomes as follows:

$$EvR = 5 \times 3 + (7+7+7+2+2+2+2) \times 1 = 44$$

Then, an exposure amount (aperture, shutter speed, sensitivity gain) corresponding to this photometric evaluation value is determined for one image pickup portion R. The method for determining the exposure amount can be one employed in ordinary cameras and therefore detailed description is omitted herein.

Then an exposure amount for the other image pickup system L is controlled so as to become equal to that of the pickup system R, based on the evaluation value EvR of the pickup system R.

Next described is a case of the panorama photography mode.

Figure 4A:
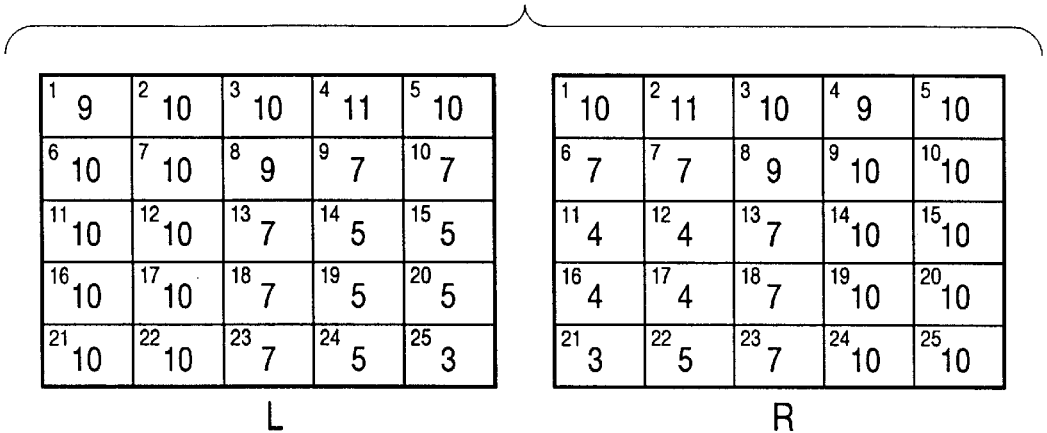
FIGS. 4A and 4B are drawings to illustrate an example of photometry data in the panorama mode and weighting factors therefor.

Suppose the luminance data as shown in FIG. 4A was obtained as photographic data.

Since the panorama photographic mode is selected, the left and right image pickup portions are directed to different fields. For example, FIG. 4A shows an example of photometric data for a scene where the left image plane of L includes a dark portion on the right side in the plane while the right image plane of R includes a dark portion on the left side in the plane.

In such a case, luminance distributions of the left and right data are often different from each other when a correlation is taken between them.

Accordingly, the position of main object is determined in a total plane of the two image planes. Namely, taking the two image planes as a single image plane, the position of main object is determined employing the photometry and evaluation system as used in the ordinary silver-salt cameras.

In this example, because luminances in the right center portion of the left image plane and luminances in the left center portion of the right image plane are smaller than those in the peripheral portions, it is determined that a main object is located nearly at the center of the combined plane of the two image planes (i.e., in the right center portion of the left image plane and the left center portion of the right image plane).

Thus, photometry with weighting in the central portion of the combined plane of the two image planes is employed i.e., in the right center portion of the left image plane and the left center portion of the right image plane (hereinafter referred to as average combining-portion-weighted metering).

Figure 4B:
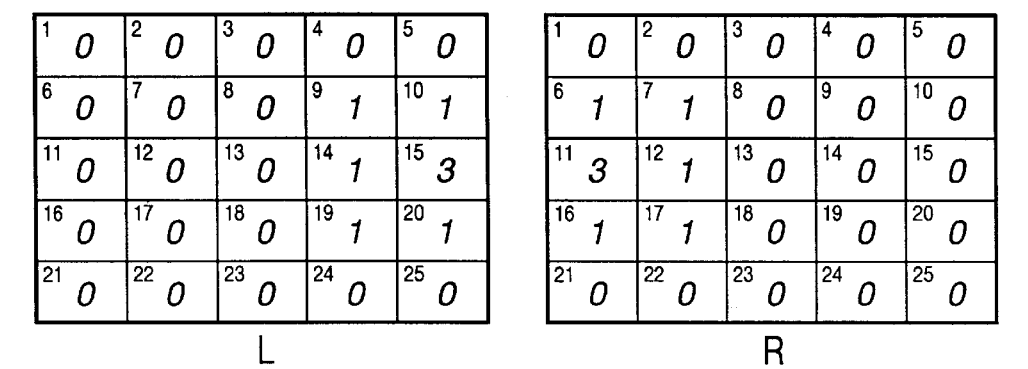

For example, as shown in FIG. 4B, a weighting factor Cmax=3 is assigned to each of block 15 of the left pickup portion and block 11 of the right pickup portion. Also, a weighting factor Cl=1 is assigned to each of blocks 9, 10, 14, 19, 20 of the left pickup portion and blocks 6, 7, 12, 16, 17 of the right pickup portion. Further, Cmin=0 is assigned to all other blocks.

Calculating with such weighting factors, a photometric evaluation value becomes as follows:

$$EvAB=(5+4)\times 3+\{(7+7+5+5+5)+(7+7+4+4+4)\}\times 1.$$

Based on this value, an exposure amount (aperture, shutter speed, sensitivity gain) of the image pickup portion A, B can be determined.

Then, based on this evaluation value EvAB, the exposure amounts of the image pickup systems A, B are controlled so as to become equal to each other.

Now, here is described an example where a correlation is low between left and right luminance distributions in the 3D mode.

Figure 5:
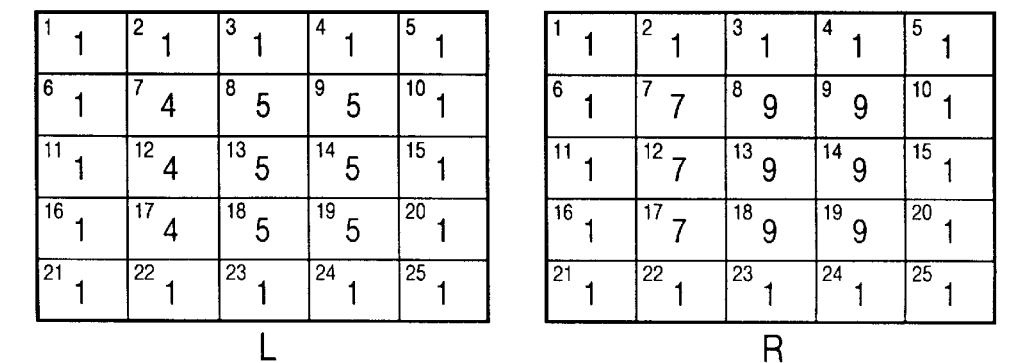
FIG. 5 is a drawing to show an example with low correlation between left and right photometry data in the 3D mode.
Figure 7:
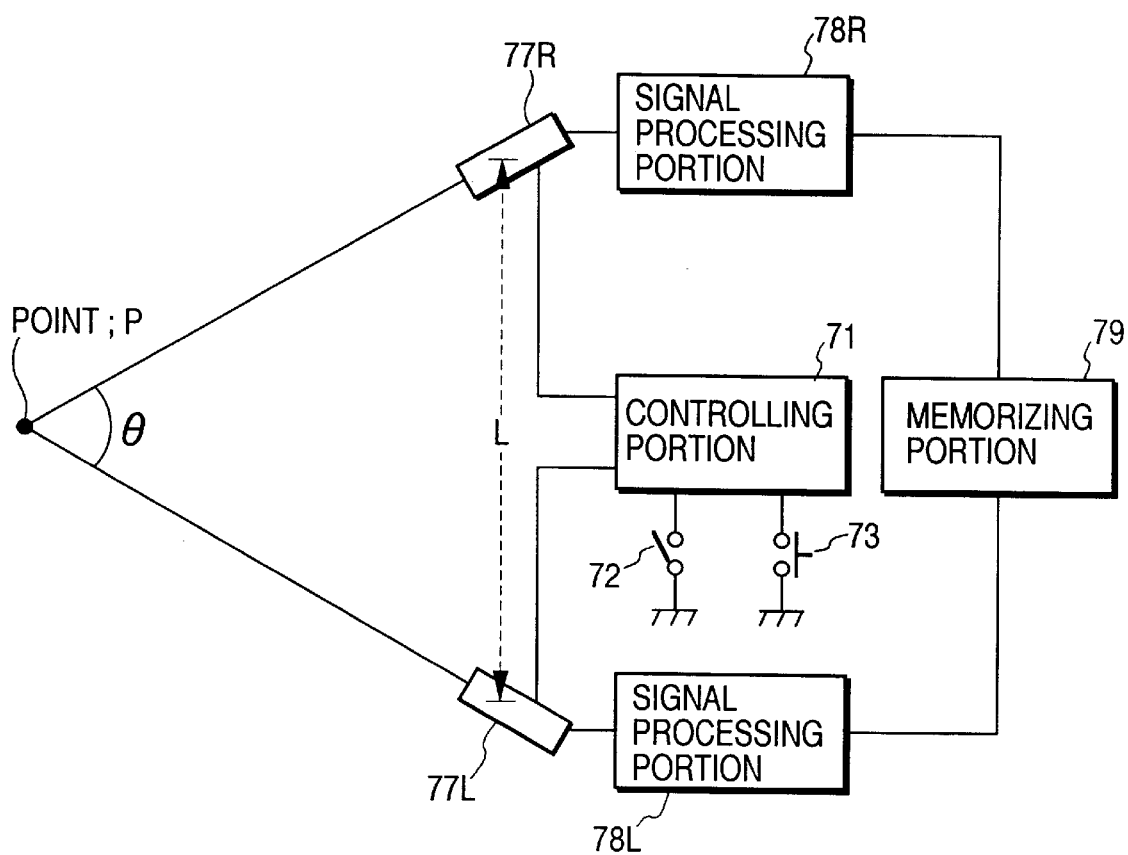
FIG. 7 is a drawing to show structure of a conventional example of multi-eye image pickup camera.

Let us suppose that the luminance data as shown in FIG. 5 was obtained as photographic data. It is considered that such a scene is taken when an object is obliquely illuminated.

Let us assume here that the object was determined to be located nearly in the central portion in each of the entire image planes.

In the above case, if one image plane (for example, the left image plane) is metered by the center-weighted metering and if, based on an evaluation value thereof, an exposure amount of the other image pickup system is controlled, appropriate exposure cannot be attained for the image plane (right image plane).

Accordingly, similarly as in the method as described previously, the image planes are metered by the average center-weighted metering for example with the weighting factors as shown in FIG. 3B (or possibly with other factors), to obtain respective evaluation values EvA, EvB.

Then a final evaluation value is obtained as follows:

$$EvAB=(EvA+EvB)/2.$$

Based on this value, exposure amounts (aperture, shutter speed, sensitivity gain) of the image pickup systems A, B are controlled so as to become equal to each other.

Next described is the sequence of operations in the present embodiment.

The present embodiment is arranged with controls of convergence angle, autofocus (AF) operation, etc., and they are briefly described here to avoid complication of description.

First, in repose to selection of the changeover switch 2 into either the 3D mode or the panorama mode, the convergence angle between the two image pickup systems is controlled and the focus and zoom magnification of each optical system is controlled. Then, in response to selection of the record trigger switch 3, two images are taken into the memory 16 and are subjected to various image processing operations (for example, combining and aspect conversion in the panorama mode) in the signal processing unit 18. The data is recorded by the recording portion 21 and also is output through a reconstructing process 19 to EVF 20.

Among the above operations the exposure control sequence is described in further detail with reference to FIGS. 6A and 6B.

The description here concerns only the exposure control operation directly related to the present invention.

With start of exposure control, CPU 1 detects a state of mode SW2 shown in FIG. 1 to determine whether the photographic mode is either the panorama mode or the 3D mode (at step S1).

If the panorama mode is selected the flow goes to step S2; if the 3D mode is selected then the flow goes to step S3.

The 3D mode is first described.

First, a luminance distribution of each image plane is checked at step S3. This is executed in such a manner that the control unit 1 shown in FIG. 1 reads data through the memory control unit 17 from the memory 16 to calculate the luminance levels of the blocks as shown in FIG. 3A.

At step S4 a correlation is obtained between two images of the left and right image pickup systems. Here, if the correlation is greater than a predetermined value then the flow goes to step S5; if it is smaller than the predetermined value then the flow transfers to step S9.

At step S5 it is determined where the main object is located. If the main object is determined to be located near the center of image plane then the flow goes to step S6. Unless the main object is determined to be located near the center of image plane then the flow goes to step S7.

At step S6 the center-weighted metering is carried out for one image pickup system, as described previously, to calculate an exposure evaluation value EvA. Then an exposure evaluation value EvB of the other image pickup system is set to the same value as the exposure evaluation value EvA.

At step S7 an exposure evaluation value EvA is calculated with weights on portions other than the center, because the object is not located near the center.

Then an exposure evaluation value EvB of the other image pickup system is set to the same value as the exposure valuation value EvA.

Then at step S8, the exposure amounts of the respective image pickup systems are controlled based on the exposure values obtained by the above calculation.

Next described is a case where the correlation is determined smaller than the predetermined value at step S4 and then steps from step S9 are executed.

At step S9 it is determined where the main object in each of the left and right image pickup systems is located, similarly as at step S5. If the main subject is determined to be located near the center of image plane for both of the left and right image pickup systems then the flow goes to step S10. If it is determined that the main object is not located near the center of image plane for either one of the left and right image pickup systems or for both of the image pickup systems, then the flow goes to step S11.

At step S10 left and right exposure evaluation values are calculated independently of each other. In more detail, the center-weighted metering is carried out for the image plane of left pickup system L to calculate the exposure evaluation value EvA while the center-weighted metering is carried out for the image plane of right pickup system R to calculate the exposure evaluation value EvB.

At step S11 exposure evaluation values EvA, EvB of the respective image pickup systems are calculated with weights on portions other than the center portion, because the subject is not located near the center of photographic image plane.

At step S12 an overall exposure evaluation value EvAB of the left and right image planes is calculated based on the left and right evaluation values EvA, EvB obtained at above step S10 or step S11. The evaluation value EvAB may be obtained by taking an arithmetic mean of EvA and EvB with a same weight. Namely, EVAB=(EvA+EvB)/2. As another possible method, the evaluation value EvAB can be obtained by taking an arithmetic mean with different weights on the left and right planes.

At step S8 the exposure amounts of the respective image pickup systems are controlled based on the exposure values obtained by the above calculation.

Next described is the control of exposure amounts in the panorama mode.

First, at step S2 luminance distributions of the respective image planes are checked similarly as at step S3.

At step S13 it is determined where the main object is located. If the main object is determined to be located near the overlapping portion in a combination of the two image planes, that is, near blocks 9, 10, 14, 15, 19, 20 on the L side and blocks 6, 7, 11, 12, 16, 17 on the R side in FIG. 4A, the flow goes to step S14. Unless the main object is determined to be located near the overlapping portion, the flow goes to step S15.

At Step S14 the photometry with weights on the central portion of the combined plane of the two image planes (i.e., on the right center portion of the left image plane and the left center portion of the right image plane), which is the average combining-portion-weighted metering as shown in FIG. 4B, is carried out to calculate evaluation values EvA, EvB equal to each other for the respective image pickup systems.

At step S15 exposure evaluation values EvA, EvB are calculated with weights on portions where the main subject is located, other than the combining portion, because the object is not located near the combining portion of the two image planes. Here, the evaluation values of the two image pickup systems are also set to a same value.

Then at step S8, the exposure amounts of the respective image pickup systems are controlled based on the exposure values obtained by the above calculation.

The multi-eye image pickup apparatus is thus arranged to have a plurality of image pickup portions each properly adjusted in exposure amount by the exposure amount control as described above.

Next described is a second embodiment of the present invention.

The first embodiment as described above was arranged to obtain the correlation between the luminance patterns of the left and right entire image planes and to use it for determination of weights for photometry, whilst the range to take the correlation does not always have to be the entire image planes but may be determined ignoring the correlation between blocks with low photometric weights by the photometric weighting. High-speed processing can be expected with this arrangement. Also, accuracy of determination of correlation can be improved.

Further, it is of course that the way of zone split of the image planes is not limited to that shown in FIG. 3A, but various patterns can be applicable.

Further, the above embodiment showed an example where the brightness Was calculated by image processing on memory, but the multi-split photometry can be optically carried out, for example, as in the ordinary silver-salt cameras.

Further, the above embodiment was described as an example where the apparatus had both the 3D mode and the panorama mode, but the present invention can be applied to multi-eye cameras only for panorama mode without 3D mode, employing the combining-portion-weighted metering. Of course, the invention can be applied to cameras only for 3D mode.

Further, in order to simplify the system, the apparatus may be arranged in such a manner that without determining the position of main object, the combining-portion-weighted metering is carried out for the both left and right images in the panorama mode while the center-weighted metering is carried out for one image in the 3D mode. As another possible arrangement, some weight patterns are preliminarily prepared to select one of the weight patterns depending upon the photographic mode.

Further, the apparatus may be so arranged that the position of object is obtained by AF and weighted metering is carried out for the thus obtained portion. In another modification, split and selection of distance measuring area can be determined totally considering a plurality of image planes, similarly as the photometric blocks.

Also, it is possible that AF is used to detect which of a plurality of image pickup systems includes a main object and that photometric values are determined with weights on photometric values of the images.

What is claimed is:

1. A multi-eye image pickup apparatus, comprising:

first image pickup means for picking up a first image;

second image pickup means for picking up a second image;

first exposure amount controlling means for controlling a first exposure amount of said first image pickup means;

second exposure amount controlling means for controlling a second exposure amount of said second image pickup means;

image pickup mode selecting means for performing selection of a mode for performing a panorama image pickup using said first and second image pickup means and a mode for performing a 3D image pickup using said first and second image pickup means; and exposure amount determining means for determining said first and second exposure amounts;

wherein, when a main object lies in an overlapped portion between said first and second images at said panorama image pickup mode, said exposure amount determining means determine said first and second exposure amounts based on a result of photometry wherein said overlapped portion is weighed and wherein, when distributions of luminance of said first and second images lie in a state at said 3D image pickup mode, said exposure determining means determine said first and second exposure amounts based on a result of photometry of one of said first and second images.

2. An apparatus according to claim 1, wherein, when said image pickup mode selecting means select said panorama image pickup mode and a main object lies in a non-overlapped portion between said first image picked-up by said first image pickup means and said second image picked-up by said second image pickup means, then said exposure amount determining means determine said first and second exposure amounts based on a result of photometry wherein said non-overlapped portion is weighed.

3. An apparatus according to claim 1, wherein, when said image pickup mode selecting means select said 3D image pickup mode and a correlationship between distributions of luminance of said first image picked up by said first image pickup means and said second image picked up by said second image pickup means lies in a first state, then said exposure amount determining means determine said first and second exposure amounts based on a result of photometry for any of said first image picked up by said first image pickup means and said second image picked up by said second image pickup means and wherein, when said image pickup mode selecting means select said 3D image pickup mode and a correlationship between distributions of luminance of said first image picked up by said first image pickup means and said second image picked up by said second image pickup means lies in a second state, then said exposure amount determining means determine said first and second exposure amounts based on results of photometry for each of said first image picked up by said first image pickup means and said second image picked up by said second image pickup means.

4. An apparatus according to claim 3, wherein, when said image pickup mode selecting means selects said 3D image pickup mode and a correlationship between distributions of luminance of said first image picked up by said first image pickup means and said second image picked up by said second image pickup means lies in said first state, then said exposure amount determining means substitutes a value of one of said determined first and second exposure amounts as a value of the other one thereof.

5. An apparatus according to claim 1, wherein said exposure amount determining means comprises judging means for judging whether a correlationship of distributions of luminance between said first image picked up by said first image pickup means and said second image picked up by said second image pickup means lies in a first state or a second state, wherein said first state is characterized in that said correlationship is closed and said second state is characterized in that said correlationship is not closed.

6. A multi-eye image pickup apparatus, comprising:

first image pickup means for picking up a first image;

second image pickup means for picking up a second image;

first exposure amount controlling means for controlling a first exposure amount of said first image pickup means;

second exposure amount controlling means for controlling a second exposure amount of said second image pickup means;

image pickup mode selecting means for performing selection of a mode for performing a panorama image pickup using said first and second image pickup means and a mode for performing a 3D image pickup using said first and second image pickup means; and exposure amount determining means for determining said first and second exposure amounts;

wherein said exposure amount determining means can determine said first and second exposure amounts based on a result of photometry wherein an overlapped portion between said first and second images is weighed at said panorama image pickup mode and wherein said exposure amount determining means makes orders of determination of said first and second exposure amounts different based on correlation of said distributions of luminance of said first and second images at said 3D image pickup means.

7. A multi-eye image pickup apparatus, comprising:

first image pickup means for picking up a first image;

second image pickup means for picking up a second image;

first exposure amount controlling means for controlling a first exposure amount of said first image pickup means;

second exposure amount controlling means for controlling a second exposure amount of said second image pickup means;

exposure amount determining means for determining said first and second exposure amounts at the time of panorama image pickup using said first and second image pickup means;

wherein when a main object lies in an overlapped portion between said first and second images, said exposure amount determining means determines said first and second exposure amounts based on a result of photometry wherein said overlapped portion is weighed or wherein when a main object lies in a non-overlapped portion between said first and second images, said exposure amount determining means determines said first and second exposure amounts based on a result of photometry wherein said non-overlapped portion is weighed.

8. A multi-eye image pickup apparatus, comprising:

first image pickup means for picking up a first image;

second image pickup means for picking up a second image;

first exposure amount controlling means for controlling a first exposure amount of said first image pickup means;

second exposure amount controlling means for controlling a second exposure amount of said second image pickup means;

exposure amount determining means for determining said first and second exposure amounts at the time of 3D image pickup using said first and second image pickup means;

wherein when correlation of distributions of luminance of said first and second images is high, said exposure amount determining means determines said first and second exposure amounts based on a result of photometry of any one of said first and second images and wherein when correlation of distributions of luminance of said first and second images is low, said exposure amount determining means determines said first and second exposure amounts based on a result of photometry of each of said first and second images.

* * * * *

UNITED STATES PATENT AND TRADEMARK OFFICE
CERTIFICATE OF CORRECTION

PATENT NO.   : 5,903,303
DATED        : May 11, 1999
INVENTOR(S)  : Fukushima et al.

It is certified that error appears in the above-identified patent and that said Letters Patent is hereby corrected as shown below:

Column 10, Claim 6, Line 10, delete "image pickup means" and insert therefor -- image pickup mode --.

Signed and Sealed this

Thirteenth Day of June, 2000

Attest:

Q. TODD DICKINSON

*Attesting Officer*    *Director of Patents and Trademarks*